(12) United States Patent
Jordan

(10) Patent No.: US 8,573,446 B2
(45) Date of Patent: Nov. 5, 2013

(54) ARTICULATING FEEDSTOCK DELIVERY DEVICE

(75) Inventor: Kevin Jordan, Newport News, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 264 days.

(21) Appl. No.: 13/199,101

(22) Filed: Aug. 19, 2011

(65) Prior Publication Data
US 2012/0273088 A1   Nov. 1, 2012

Related U.S. Application Data

(60) Provisional application No. 61/517,780, filed on Apr. 26, 2011.

(51) Int. Cl.
*B67D 7/74* (2010.01)
*B67D 7/78* (2010.01)
*B05B 15/00* (2006.01)

(52) U.S. Cl.
USPC ............. 222/129; 222/145.4; 239/132.3

(58) Field of Classification Search
USPC .......... 222/129, 145.4; 239/132, 132.1, 132.3
See application file for complete search history.

(56) References Cited

U.S. PATENT DOCUMENTS

| | | | | |
|---|---|---|---|---|
| 3,615,242 A | * | 10/1971 | Anderson et al. | 422/49 |
| 3,741,165 A | * | 6/1973 | Matthews et al. | 122/6.5 |
| 3,915,358 A | * | 10/1975 | Hehl | 222/496 |
| 4,431,607 A | * | 2/1984 | Casperson | 422/150 |
| 4,687,642 A | * | 8/1987 | Nielsen | 422/140 |
| 2002/0074735 A1 | * | 6/2002 | Gasper et al. | 277/558 |
| 2009/0226243 A1 | * | 9/2009 | Krywitsky | 403/38 |

* cited by examiner

*Primary Examiner* — Kevin P Shaver
*Assistant Examiner* — Stephanie E Williams

(57) ABSTRACT

A fully articulable feedstock delivery device that is designed to operate at pressure and temperature extremes. The device incorporates an articulating ball assembly which allows for more accurate delivery of the feedstock to a target location. The device is suitable for a variety of applications including, but not limited to, delivery of feedstock to a high-pressure reaction chamber or process zone.

1 Claim, 4 Drawing Sheets

ARTICULATING FEEDSTOCK DELIVERY DEVICE

This application claims priority from U.S. Provisional Patent application No. 61/517,780 filed on Apr. 26, 2011.

The United States of America may have certain rights to this invention under Management and Operating Contract No. DE-AC05-84ER 40150 from the Department of Energy.

FIELD OF THE INVENTION

The present invention relates to a device for delivering liquids and solids to a target location.

BACKGROUND OF THE INVENTION

Reaction chambers and process-controlled zones are used in a variety of fields and technologies. There is often a need to deliver a feedstock, i.e., gas, liquid, or solid to such reaction chamber or process-controlled zone. Delivery of such feedstock material can be difficult as such locations frequently operate under extreme environmental conditions. For example, a reaction chamber may operate under pressure and temperature extremes. It is therefore desirable to have a feedstock delivery device which is able to effectively operate at pressure extremes, i.e., from a high vacuum to over 1,000 PSI, and with large temperature gradients at the point of feedstock delivery.

Moreover, precise delivery of the feedstock within the reaction chamber or process-controlled zone is often essential for the most effective operation of the reaction or process. This is particularly true in the case of reaction chambers which utilize high power lasers. The positioning of the laser beam in relation to the feedstock may be critically important to the pertinent reaction. Traditionally, the feedstock is introduced into the chamber and then the laser is adjusted so as to achieve the desired interaction. These traditional methods are problematic as it is difficult and time consuming to move the path of the laser beam. Therefore, a need exists for a feedstock delivery device that is able to adjust the target delivery location while the path of the laser or other such source remains fixed.

OBJECT OF THE INVENTION

It is an object of the invention to provide a fully articulating feedstock delivery device which can work at pressure and temperature extremes.

SUMMARY OF THE INVENTION

The instant invention is a feedstock delivery device for the delivery of a variety of materials to a desired location. The device provides numerous benefits which make it ideal to deliver material to a reaction chamber or a process-controlled zone. The device can be used to supply material in gas, liquid, or solid form to the desired location and the will operate satisfactorily at pressure and temperature extremes. Further, the device is articulable so as to facilitate delivery of the feedstock material to the required location.

The device includes an articulating ball mounted in a sealed housing. The device is cooled by cooling lines which run the length of the feedstock delivery tube and provide a cooling flow for the device head.

DETAILED DESCRIPTION

The invention disclosed herein is a feedstock delivery device for the delivery of a variety of materials to a target location. Various novel and beneficial features of this device make it ideal to deliver material to a reaction chamber or a process-controlled zone. The device can be used to supply material in gas, liquid, or solid form to the desired location. The device can also deliver the feedstock in any combination or variation of the foregoing forms including, but not limited to, slurry, powder, and stiff solids. One use of the invention would be to supply boron or boron nitride to a high-pressure reaction chamber for interaction with a high power laser.

The device will operate satisfactorily at pressure and temperature extremes. Specifically, the device will operate at pressures from high vacuum to extremely high pressures (>1,000 PSI). Further, when properly cooled, the device can continue to function effectively within temperature gradients in excess of 1832° Fahrenheit (1000° Celsius) per millimeter. In addition, the device is articulable so as to allow precise positioning along the x and y axes.

Figure 1:
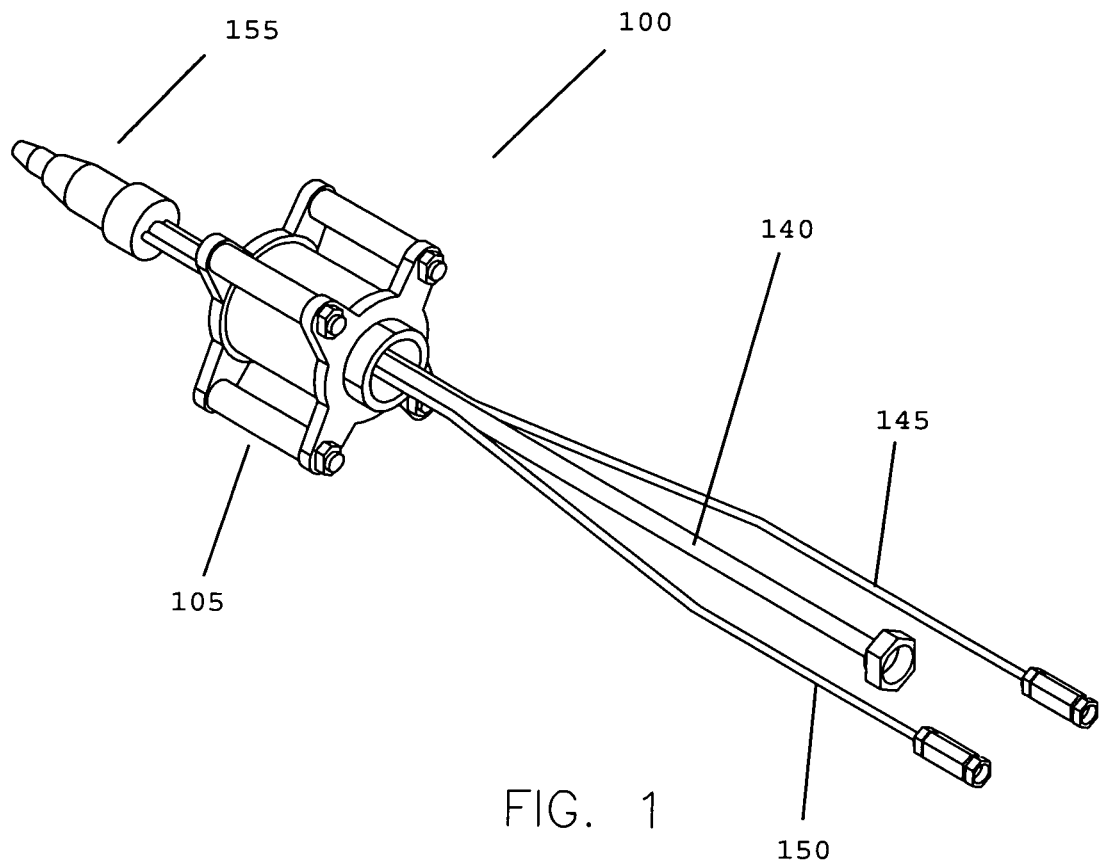
FIG. 1 is a perspective view of the housing assembly with device head and delivery lines attached.
Figure 2:
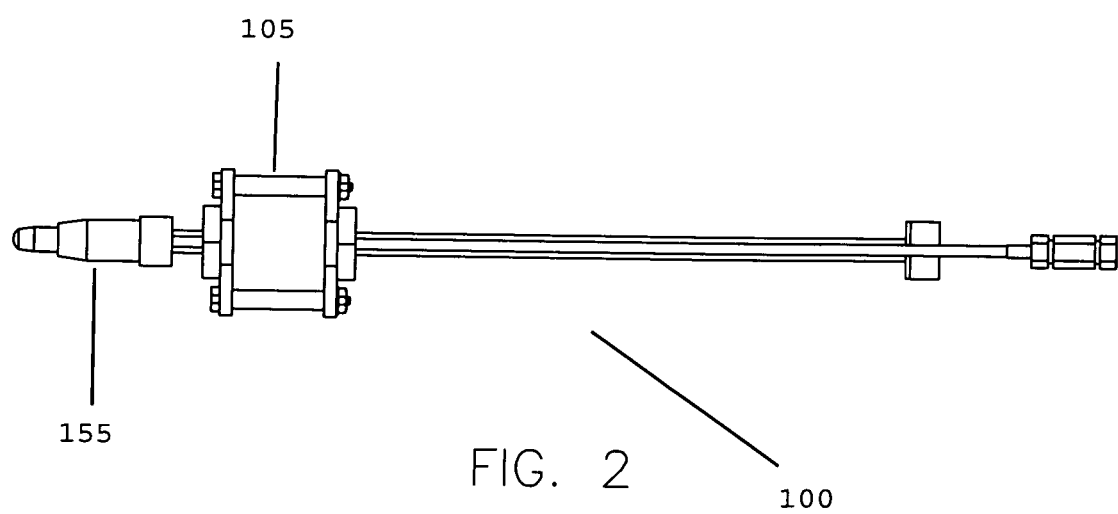
FIG. 2 is a side view of the housing assembly with device head and delivery lines attached.
Figure 3:
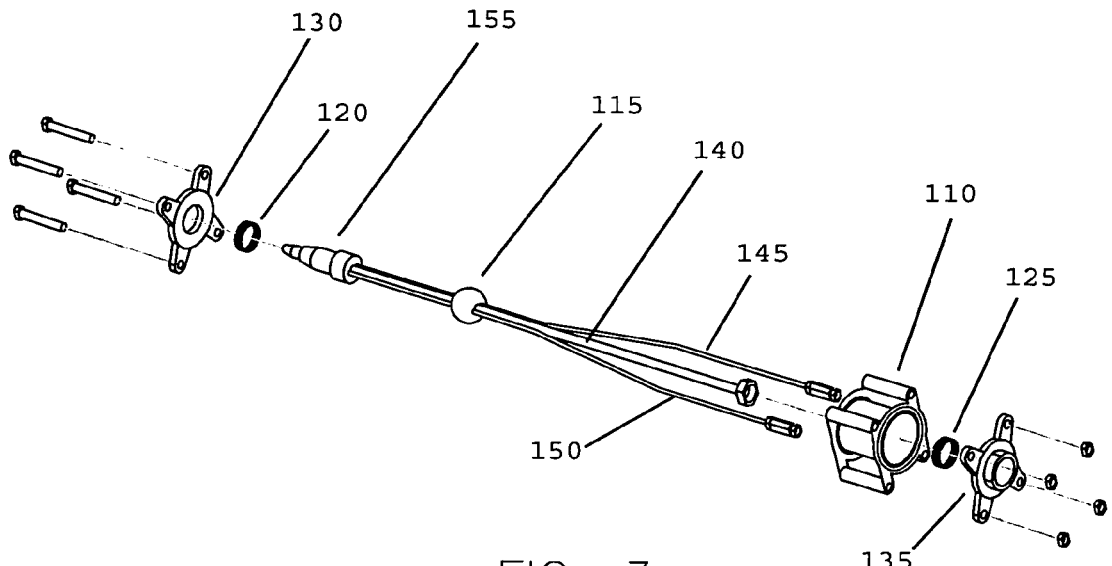
FIG. 3 is an exploded view of the housing assembly with device head and delivery lines attached.
Figure 4:
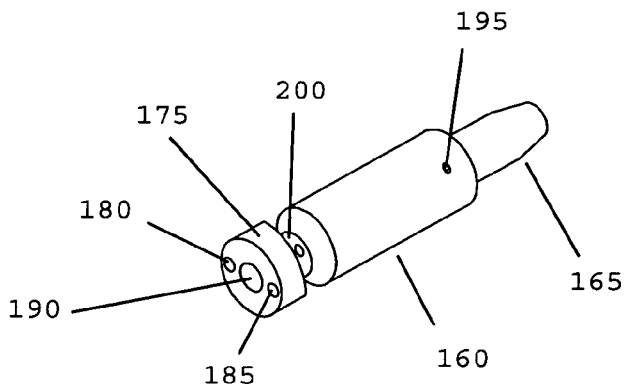
FIG. 4 is a perspective view of a device head.
Figure 5A:
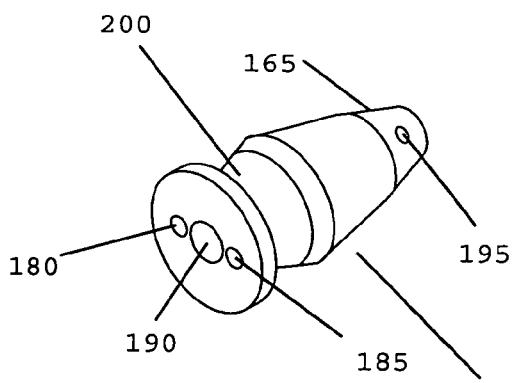
FIG. 5 is a perspective view of an alternate device head (5*a*) and sealing collar (5*b*).
Figure 5B:
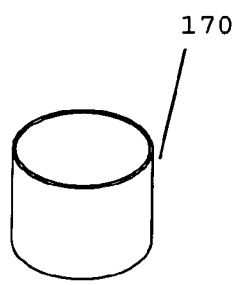

As best seen in FIGS. 1 and 2, the feedstock delivery device 100 consists of four principal sections or components: (1) housing structure or first portion, (2) device head or second portion, (3) support structure or third portion, and (4) delivery lines or fourth portion. The respective sections are as follows:

Housing Structure:

Referring now to FIG. 3, the housing structure 105 is comprised of a hollow cylindrical body 110, an articulating ball element 115 disposed within the cylindrical body, two sealing rings 120, 125, and two capping members 130, 135. The ball element 115 can be constructed in varying sizes and composed of any suitable material. For convenience, the ball element 115 can be prepared by modifying an existing ball valve device.

In a first preferred embodiment, the ball 115 would be a 1⅜ inch (3.4925 cm) ball composed of brass. A passage ¼ inch in diameter is drilled through the core of the ball to form a primary passage. The primary passage is then fitted with a stainless steel primary tube 140. One or more additional passages can also be drilled through the ball element along the axis of and parallel to the primary passage. The assembly is then brazed to insure a pressure seal in the ball element assembly, i.e., the primary delivery tube 140 is then brazed to the interior of the ball member 115 and, further, the delivery tube and the cooling lines within the housing are further brazed together. One or more additional passages can also be drilled through the ball element 115 along the axis of and parallel to the primary passage.

Figure 7:
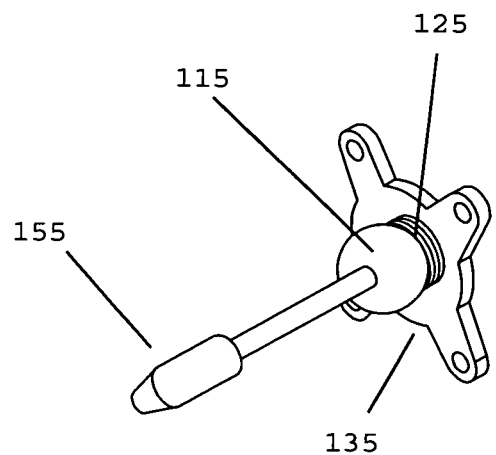
FIG. 7 is a perspective view of articulating ball and one seal.

The sealing rings consist of an inner sealing ring 125 and an outer sealing ring 120. Each sealing ring is made from Teflon or a similar material and is contoured to the ball element 115. One sealing ring is positioned on the input side of the ball element and one is positioned on the output side of the ball element. The capping members 130, 135 are then placed on either side of the sealing rings so as to create a seal by holding the rings in sealable contact with the ball element 115. The capping members can be designated, respectively, as the front 135 and rear 130 capping members. FIG. 7 is a cut-away view of the ball element seated within the outer sealing ring 125. The capping members are secured to the cylindrical body 110 through a nut and bolt arrangement or other analogous fastening means. While the ball element 115 is retained within the sealing rings, it is otherwise free to rotate within the cylindrical body 110.

Delivery Lines

The stainless steel primary tube 140 is the feedstock delivery line. The line originates in the staging or third portion, passes through the housing structure 105, and terminates in the device head 155 as shown in FIGS. 1 and 2. In a preferred embodiment, two cooling lines are brazed to the delivery line (from a point just prior to the housing structure and extending until termination of the cooling lines in the device head.) When two such cooling lines 145, 150 are used, one line acts as the cooling supply line and one acts as the cooling return line. The cooling lines can be used to cool the device head through the circulation of liquid or gas coolant. The cooling supply lines 145, 150 are in fluid (or gaseous) contact with a source of cooling fluid (or gas). In the preferred embodiment, the feedstock delivery line 140 and the two attached cooling lines 145, 150 may be referred to as the central conduit.

Figure 8:
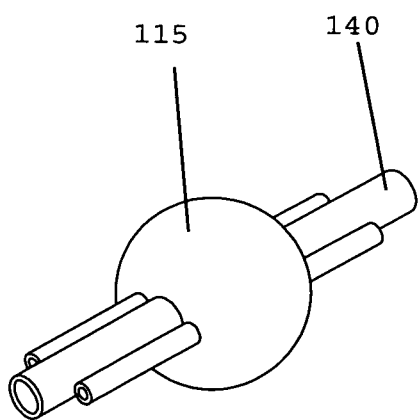
FIG. 8 is the articulating ball with attached delivery lines.
Figure 9:
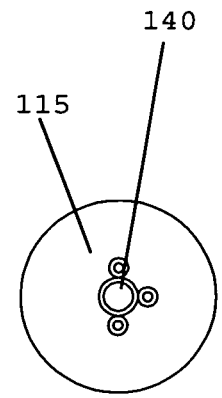
FIG. 9 is a frontal view of the articulating ball along the long axis of the delivery lines.
Figure 10:
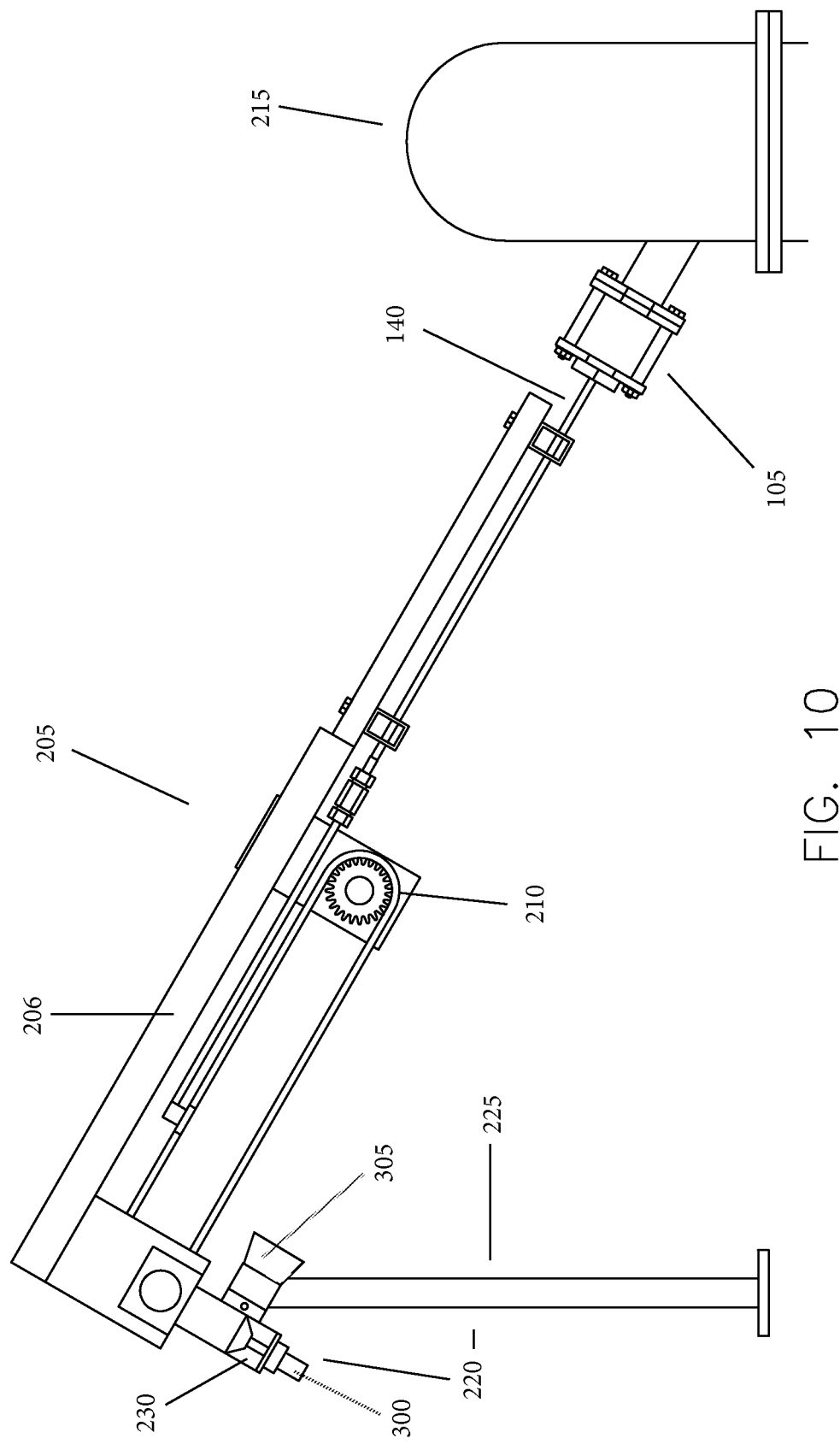
FIG. 10 is a perspective view of the feedstock delivery device in its entirety.

The device can further incorporate a secondary delivery line. In such an embodiment, the secondary delivery line can be used to introduce a fluid or gas, independent of the primary feedstock, to the target location. The secondary delivery line could, for instance, add any buffer gas or liquid to a reaction zone. In a preferred embodiment including this secondary line, as shown in FIGS. 8 and 9, the line would pass through the ball element and would then be positionable independent of the primary delivery line 140 and device head 155.

Device Head

As seen in FIGS. 1 and 2, the central conduit terminates at the device head 155. The device head 155 consists of a circular base portion 160, delivery tip 165, and a sealing sleeve 170. The base portion has a first end, or inlet end, and second end, or output end. In a preferred embodiment, the first inlet end includes a circular base 175 with three or more generally circular apertures, the circular apertures being a first cooling opening 180, a second cooling opening 185, and a central delivery opening 190. The cooling openings are positioned so as to be aligned with the cooling supply line and cooling return line, respectively, originating from the articulating ball. The output end has an outlet aperture which is disposed to receive the delivery tip 165. The central delivery opening 190 is axially aligned with an aperture on the output end and disposed to receive the feedstock delivery line 140 originating from the articulating ball 115. The feedstock delivery line and the cooling lines are sealably connected to the appropriate openings in the base portion. The feedstock delivery tube 140 penetrates the base 175 and is brazed thereto. The cooling supply and return lines pass into the respective cooling openings 180, 185 and are also brazed into place.

Figure 6:
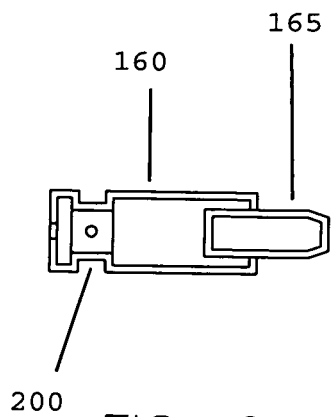
FIG. 6 is a cross-sectional view of a device head.

The delivery tip 165 is seated within the output end and butts up against the feedstock delivery tube 140. The delivery tip 165 is secured in position via one or more set screws 195. The use of set screws facilitates the removal and replacement of the delivery tip. The delivery tip 165 comprises a nozzle through which the feedstock exits the delivery device and is directed to the target location. Accordingly, the nozzle includes a passage therethrough which connects the outlet aperture with the nozzle aperture whereby feedstock travels from the feedstock delivery line through the central delivery opening, through the device head and ultimately to the target location. FIG. 6 provides a cross-sectional view of a device head 155 in a preferred embodiment.

Any of a variety of different nozzle portions may be utilized in the device. The nozzle can be fashioned as a sonic jet or shaped to spray in a variety of patterns. The shape of the distribution stream may be modified by varying the diameter or shape of the nozzle aperture and other such characteristics in such nozzles. It will be recognized that the delivery tip need not be a separate component from the nozzle portion, i.e., if no interchangeability is desired, the delivery tip can be integrated with the base portion.

A groove or cooling channel 200 is cut around the circumference of the base portion just above the circular base. The first and second cooling openings 180, 185 extend through the circular base and open into the space of the cooling channel 200. The sealing sleeve 170 is disposed over the cooling channel and seals in the coolant, effectively making the cooling system a closed system. The sealing sleeve 170 is secured by brazing it on the device head 155.

Support Structure and Feedstock Supply

In a preferred embodiment, the feedstock delivery tube 140 is in communication with a source of feedstock in the support structure portion 205 of the device. The support structure includes a support rail 206. It will be recognized that the source of feedstock may be remote depending on the particular feedstock and other such operational parameters. Regardless, the feedstock is introduced into the delivery tube at some point prior to entry of the delivery tube 140 in the housing structure 105.

Any suitable means may be used to push or draw the feedstock along the delivery tube so long as a pressure seal is maintained in the delivery tube. The selection of the driving means would, naturally, depend on the nature of the feedstock being delivered and any other requisite parameters of delivery.

In the embodiment used to supply boron or boron nitride to a high-pressure reaction chamber, a chain-driven plunger 210 with an O-ring seal may be used to push the feedstock along the delivery tube and into the reaction chamber 215. In the foregoing embodiment, the O-ring seal is used to maintain the high-pressure seal on the feedstock source end of the device.

The support structure for the device is mounted on an x-y translation stage 220. The device is attached to a first translation stage 225 to control the pitch of the delivery and a second translation stage 230 to control the yaw of the delivery. Each translation stage 225, 230 is comprised of a platform driven by a DC motor 300, 305 which can translate in both directions along the axis upon which it is oriented. The first translation stage 225 is in contact with the floor or other such fixed structure. The second translation stage 230 is mounted to the first translation stage 225. The support rail 206 is secured to the second translation stage 230.

Operation and Use

In operation, a feedstock from a feedstock source is deposited in the delivery line. The feedstock travels along the line, through the articulating ball element, through the nozzle, and is ultimately deposited at a target location. The DC motors in the translation stages can be used to position the nozzle so as to adjust the target location as desired.

One use of the invention would be to supply boron or boron nitride to a high-pressure reaction chamber. In an embodiment for such a use, the device tip would typically include one ¼ feedstock delivery hole and two ⅛ inch water line holes. If a secondary line is used for gas delivery, the embodiment would include three ⅛ inch holes and one ¼ feedstock delivery hole.

Although it will be recognized that the device may be installed in more than one manner, the ball housing may be directly secured to the delivery chamber. In an embodiment involving a high-pressure reaction chamber, this may be accomplished through the use of a threaded fastening mechanism. The threads on the outlet aperture can be used to screw the ball housing into the delivery chamber. The ball housing may also be secured by any other suitable means, such as by welding the housing to the delivery chamber instead of using a threaded fastening mechanism.

The articulating ball is designed to withstand the high pressure being generated in the high-pressure reaction chamber. The capping members hold the seals in place which in turn permits maintenance of pressure in the reaction chamber. When a user wishes to modify the delivery target location, he operates the translation stage as desired. In turn, the articulating ball slides on the seals and can ultimately be positioned as desired, with no loss of pressure integrity and no excessive mechanical stress on the central conduit or other structural components.

In a preferred embodiment, water is used in the cooling lines. It will be recognized, however, that any suitable fluid or gas may be used depending on the cooling requirements and operational parameters of the particular use. Water is introduced into the supply cooling line, flows along the supply cooling line, passes into the cooling channel, flushes around the device tip, and then exits the channel by flowing back down the return cooling line. As mentioned above, the cooling system is a sealed system and the coolant liquid does not contact the feedstock being passed through the primary tube.

While the invention has been described in reference to certain preferred embodiments, it will be readily apparent to one of ordinary skill in the art that certain modifications or variations may be made to the device without departing from the scope of invention described in the foregoing specification.

What is claimed is:

1. An articulating delivery device comprising:
    a housing;
    an articulating ball within said housing;
    one or more sealing members to assist in maintaining a desired pressure within at least a portion of said housing;
    a delivery line having a first end and a second end wherein one end of said delivery line is attached to a support element; said line passing through said articulating ball and sealably secured to said articulating ball; said second end having an outlet opening;
    a sealing element sealably secured to said first end of said delivery line to assist in maintaining a desired pressure within said delivery line;
    at least one motor attached to said support element wherein the position of said support element may be adjusted by said at least one motor,
    whereby the position of said articulating ball may be adjusted and, further, a substance in said delivery line can be delivered via said outlet opening to a target location.

* * * * *